US008751641B2

(12) United States Patent
Collin et al.

(10) Patent No.: US 8,751,641 B2
(45) Date of Patent: Jun. 10, 2014

(54) OPTIMIZING CLUSTERED NETWORK ATTACHED STORAGE (NAS) USAGE

(75) Inventors: Cyril Collin, Clamart (FR); Edmond Plattier, Antibes (FR); Antoine J. Tabary, Levallois Perret (FR)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/247,312

(22) Filed: Sep. 28, 2011

(65) Prior Publication Data

US 2013/0073717 A1    Mar. 21, 2013

(30) Foreign Application Priority Data

Sep. 15, 2011    (EP) .................................... 11290414

(51) Int. Cl.
*G06F 15/173*    (2006.01)
(52) U.S. Cl.
USPC ......................................... 709/224; 709/227
(58) Field of Classification Search
CPC ... H04L 29/08072; H04L 29/06; H04L 43/00; H04L 29/08576
USPC ................................................. 709/224, 227
See application file for complete search history.

(56) References Cited

U.S. PATENT DOCUMENTS

| | | | | |
|---|---|---|---|---|
| 6,470,389 B1 * | 10/2002 | Chung et al. | ................... | 709/227 |
| 7,526,668 B2 * | 4/2009 | Shitomi et al. | ..................... | 714/3 |
| 7,606,916 B1 | 10/2009 | Potter et al. | | |
| 7,613,947 B1 | 11/2009 | Coatney et al. | | |
| 7,949,893 B1 * | 5/2011 | Knaus et al. | ................... | 714/4.1 |
| 2003/0101275 A1 * | 5/2003 | Maciel | ........................... | 709/235 |
| 2004/0197079 A1 * | 10/2004 | Latvala et al. | .................. | 386/46 |
| 2005/0223096 A1 | 10/2005 | Shinkai | | |
| 2010/0023621 A1 | 1/2010 | Ezolt et al. | | |
| 2010/0318605 A1 * | 12/2010 | Weis | ............................. | 709/203 |
| 2011/0170550 A1 * | 7/2011 | Takashima | .................... | 370/400 |
| 2011/0252127 A1 * | 10/2011 | Iyengar et al. | ................ | 709/224 |
| 2013/0179277 A1 * | 7/2013 | Nazem et al. | .............. | 705/14.73 |

FOREIGN PATENT DOCUMENTS

WO    WO 2004/066278 A2 *    8/2004
WO    WO2004066278    8/2004

* cited by examiner

*Primary Examiner* — Michael C Lai
(74) *Attorney, Agent, or Firm* — Schmeiser, Olsen & Watts, LLP; John Pivnichny

(57) ABSTRACT

A system and associated method for optimizing usage of a clustered-network attached storage (NAS). An administration module of the clustered NAS calculates a number of nodes in the clustered NAS necessary to service a required amount of load for a specific number of client systems, and a number of addresses associated with the nodes through which the client systems accesses the clustered NAS. The load is evenly shared by all client systems and uniformly serviced by the nodes of the clustered NAS. When a node fails, the rest of operating nodes in the clustered NAS take over addresses associated with the failed node and evenly share additional load associated with an address taken from the failed node to provide seamless services for the production by the client systems.

20 Claims, 10 Drawing Sheets

US 8,751,641 B2

OPTIMIZING CLUSTERED NETWORK ATTACHED STORAGE (NAS) USAGE

This application claims foreign priority to European Patent Office (EPO) application 11290414.9, filed on Sep. 15, 2011.

BACKGROUND

Conventional optimization technologies for clustered network attached storage (NAS) utilize load balancing among all nodes of the NAS to minimize the number and bandwidth of nodes in the clustered NAS system. In cases a node fails, conventional optimization technologies redistributes workload among the rest of nodes by use of static workload assignment, a round-robin (RR) domain name service (DNS), etc. The conventional optimization methods either lack dynamic balancing capability of workload among nodes of the NAS in case of a node failure or require double bandwidth for each node to make the NAS fail-safe for one (1) node failure.

BRIEF SUMMARY

According to one embodiment of the present invention, a method for optimizing usage of a clustered-network attached storage (NAS), comprises: configuring the clustered NAS by determining A number of addresses necessary for N number of nodes in the clustered NAS to produce L amount of load for P number of client systems coupled to the clustered NAS such that said A number of addresses enables said P number of client systems to evenly access said N number of nodes for sharing said L amount of load, wherein each node of said N number of nodes has a respective h amount of bandwidth in producing a respective load associated with said each node; configuring a respective set of addresses selected from said A number of addresses such that said P number of client systems accesses said N number of nodes via the respective set of addresses during production of said L amount of load by said P number of client systems; and administering service of the clustered NAS, concurrently with the production by said P number of client systems, by monitoring and optimizing the service of said N number of nodes in the clustered NAS such that the clustered NAS compensates a failure of a node in the clustered NAS and such that the clustered NAS seamlessly services the production of said L amount of load by said P number of client systems.

According to one embodiment of the present invention, a computer program product comprises a computer readable memory unit that embodies a computer readable program code. The computer readable program code contains instructions that, when run by a processor of a computer system, implement a method for optimizing usage of a clustered-network attached storage (NAS).

According to one embodiment of the present invention, a computer system comprises a processor, a memory coupled to the processor, and a computer readable storage device coupled to the processor, said storage device containing program code configured to be executed by the processor via the memory to implement a method for optimizing usage of a clustered-network attached storage (NAS).

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for optimizing usage of a clustered-network attached storage (NAS).

DETAILED DESCRIPTION

Figure 1:
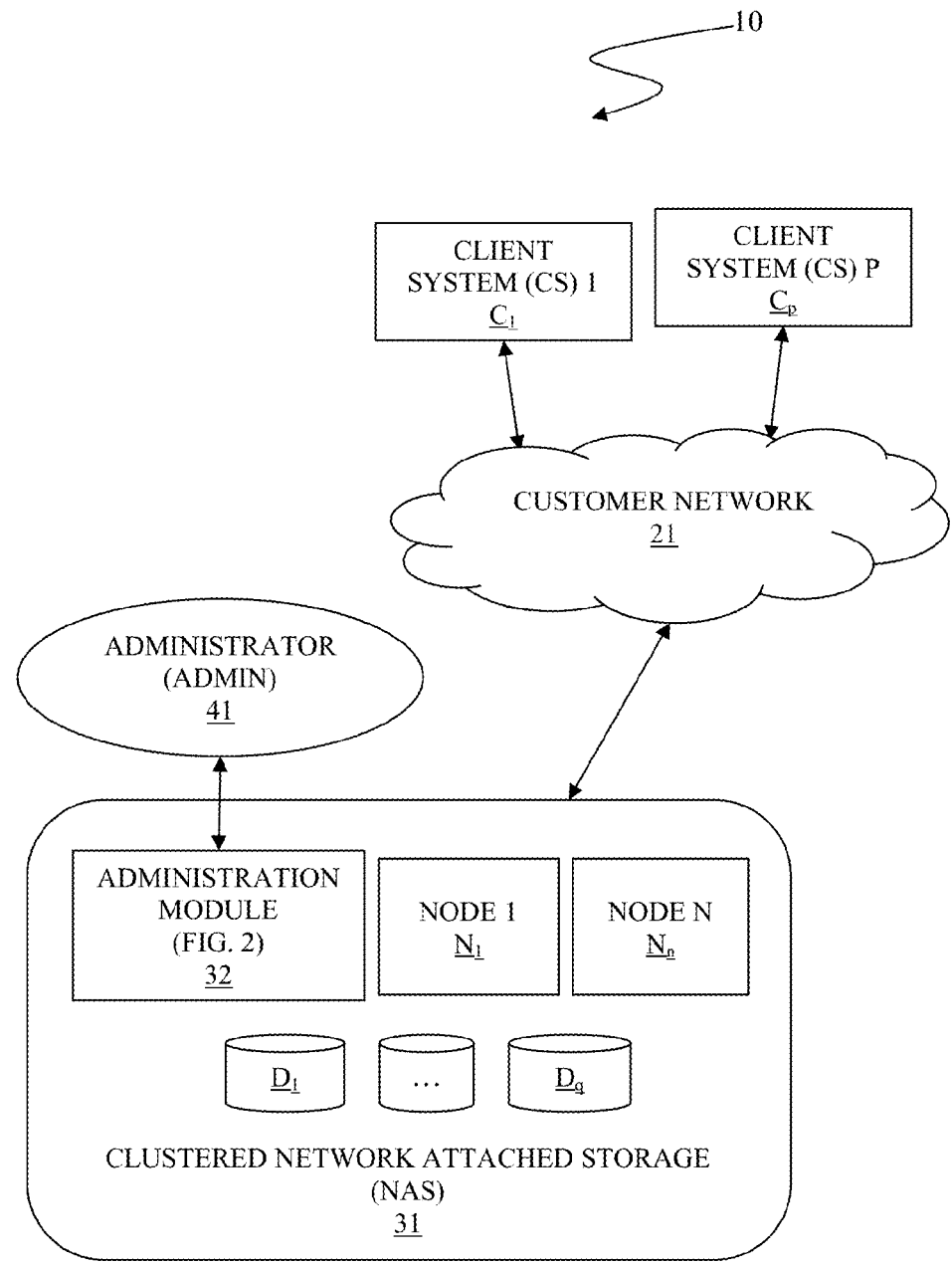
FIG. 1 illustrates a system 10 for optimizing usage of a clustered-network attached storage (NAS) 31, in accordance with embodiments of the present invention.

FIG. 1 illustrates a system 10 for optimizing usage of a clustered-network attached storage (NAS) 31, in accordance with embodiments of the present invention.

The system 10 comprises P number of client systems, a customer network 21, the clustered NAS 31, and an administrator 41. Examples of the system may be, inter alia, near real time production/service systems using the clustered NAS 31 as a repository in the areas of monitoring and evaluation (M&E), broadcasting, video surveillance, etc. Due to time-critical nature of these typical examples, efficient load balancing among operating nodes within the clustered NAS 31 significantly improves performance of the system 10 in case a node of the clustered NAS 31 fails.

An i-th client system $C_i$ of said P number of client systems, wherein i is a positive integer in a first inclusive range between one (1) and P, that is, [1 . . . P], is a respective computer system that runs a respective operating system that supporting compatible file system protocols over digital communication channels. Examples of operating systems may be, inter alia, Windows™, Linux®, Unix®, etc. (Windows is a trademark of Microsoft Corporation, in the United States and other countries; Linux is a registered trademark of Linus Torvalds in the United States; and UNIX is a registered trademark of The Open Group in the United States and other countries.) Examples of file system protocols may be, inter alia, the Common Internet File System (CIFS), Network File System (NFS), etc.

The customer network 21 is a digital communication network supporting the Internet Protocol (IP), interconnecting said client systems with the clustered NAS 31.

The clustered NAS 31 is a network-attached storage that enables data stripping by use of a distributed file system running simultaneously on multiple nodes of the clustered NAS 31. The clustered NAS 31 is a file-level computer data storage connected to the customer network 21 in providing data access to said client systems and that enables the nodes of the clustered NAS 31 to distribute data and metadata across the nodes or physical disks of the clustered NAS 31. The nodes of the clustered NAS 31 uniformly access to files stored in any physical disk within the clustered NAS 31, regardless of actual locations of the data. The clustered NAS 31 dynamically distributes addresses for nodes of the clustered NAS 31 in a round-robin (RR) way and redistributes addresses of a failing node to the remaining functioning. The clustered NAS 31 comprises an administration module 32, N number of nodes, and at least one physical disk. Components of the clustered NAS 31 are all interconnected by use of digital communication channels coupled to the customer network 21.

The administration module 32 performs configuration and monitoring of the clustered NAS 31 pursuant to inputs provided by the administrator 41. See description of FIG. 2 infra for steps performed by the administration module 32. In one embodiment of the present invention, the administration module 32 runs on a special administration node within the clustered NAS 31, wherein the special administration node is functionally and physically distinctive from said N number of nodes.

A j-th node $N_j$ of said N number of nodes in the clustered NAS 31, wherein j is a positive integer in a second inclusive range between 1 and N, that is, [1 . . . N], represents each node functioning as a member of a clustered file server for the client systems, enabling unified access to data and metadata stored in said at least one physical disk for the client systems. The client systems access and identify each node of said N number of nodes by use of a respective Internet Protocol (IP) address. In this specification, the terms "IP address" and "address" are used interchangeably.

A k-th physical disk $D_k$ of said at least one physical disk, wherein k is a positive integer in a third inclusive range between 1 and Q, that is, [1 . . . Q], and wherein Q is greater than or equal to one (1), represents each physical disk of the clustered NAS 31. Said each physical disk is physically coupled to the nodes in the clustered NAS 31 and shared by the nodes as a pool of data storage.

In one embodiment of the present invention, a respective Internet Protocol (IP) address is dynamically distributed among functioning nodes of the clustered NAS 31. First, a set of IP addresses are distributed among of the clustered NAS 31 in a round-robin way. A number of IP addresses in the set is N(N−1), wherein N is the number of nodes in the clustered NAS 31, indicating each node $N_j$ has (N−1) number of IP addresses evenly for all nodes within the clustered NAS 31. When a x-th node N, fails during production, a x-th group of (N−1) number of IP addresses that used to have been assigned to the failed node $N_x$ is redistributed to the remaining functioning nodes of the clustered NAS 31 in a round-robin way such that the clustered NAS 31 may be accessed with the same N(N−1) number of IP addresses as prior to the node failure, even with the failed node $N_x$ from the P number of client systems, $C_1$ . . . $C_p$. The same embodiment of the present invention the clustered NAS 31 dynamically balances a respective workload over (N−1) number of remaining functioning nodes by reassigning the node addresses such that increased traffic cased by the failed node is evenly shared by (N−1) number of remaining function nodes by amount of N/(N−1). Wherein the clustered NAS 31 has five (5) or more nodes, approximately twenty percent (20%) of extra node, a single extra node, is enough to make the clustered NAS 31 fail-safe for a single node failure, which is a significant improvement from conventional method of capacity doubling with a round-robin address assignment or static IP addressing.

In the same embodiment of the present invention, the system 10 comprises eighty-two (82) client systems ($C_1$, . . . $C_p$, P=82) performing as video servers, which collect data streams from supervision/surveillance cameras of one hundred and twenty (120) controlled areas and record the collected data streams on the clustered NAS 31 implementing IBM® Scale Out Network Attached Storage (SONAS) with nine (9) nodes ($N_1$, . . . $N_n$, N=9). (IBM is a trademark of International Business Machines Corporation, in the United States and other countries) IBM SONAS dynamically assigns a list of IP addresses evenly to nodes of the clustered NAS 31 by RR. Also IBM SONAS dynamically redistributes IP address of a failing node in RR by filling in IP addresses of a remaining node that has fewer IP addresses than other nodes by use of Clustered Trivial Data Base (CTDB) in an attempt to limit bandwidth buffer necessary for each node of the clustered NAS 31. In other embodiments of the present invention, the number and load of the client systems may vary based on a type of production, but are generally stable in their respective configurations. See description of FIGS. 8 and 9 infra for one example of the optimization performed in the same embodiment of the present invention.

The same embodiment of the present invention services as many client systems as a larger clustered NAS with a less number of nodes and a lower cost in providing fail-safe NAS storage for a single node failure. The method of the present invention requires maximum twenty percent (20%) throughput buffer in contrast with hundred percent (100%) throughput buffer of conventional fail-safe usage methods for clustered NAS, in cases of clustered NAS systems of more than five (5) nodes.

Figure 2:
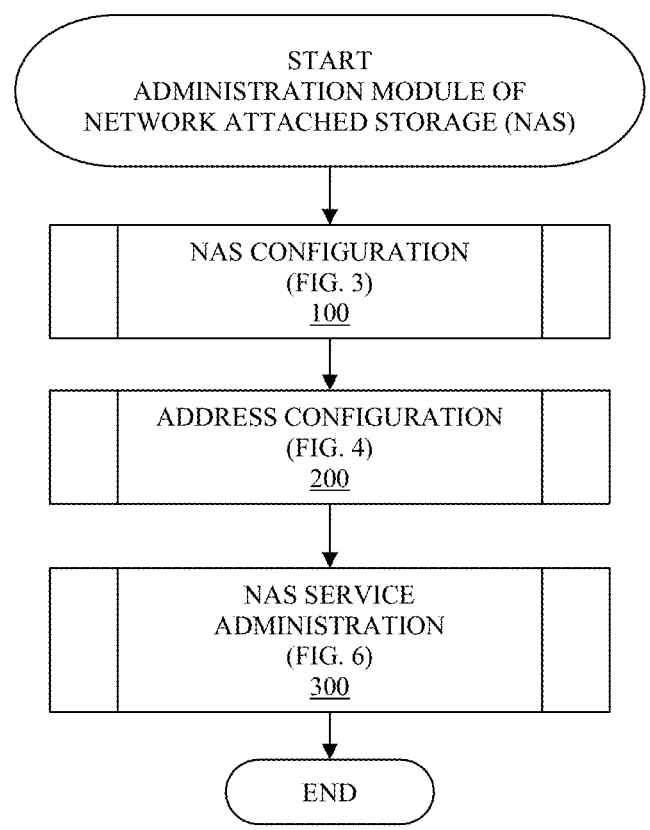
FIG. 2 is a flowchart depicting a method for optimizing usage of the clustered NAS 31 of FIG. 1, as performed by the administration module 32, in accordance with the embodiments of the present invention.

FIG. 2 is a flowchart depicting a method for optimizing usage of the clustered NAS 31 of FIG. 1 supra, as performed by the administration module 32, in accordance with the embodiments of the present invention.

In step 100, the administration module configures the clustered NAS. See description of FIG. 3 infra for details of NAS configuration in step 100. Then the administration module proceeds with step 200.

In step 200, the administration module configures addresses of the components in the NAS and client systems coupled to the NAS. See description of FIG. 4 infra for details of address configuration in step 200. See description of FIG. 8 infra for an example of the system as being initially configured after performing steps 100 and 200. Then the administration module proceeds with step 300.

Figure 5:
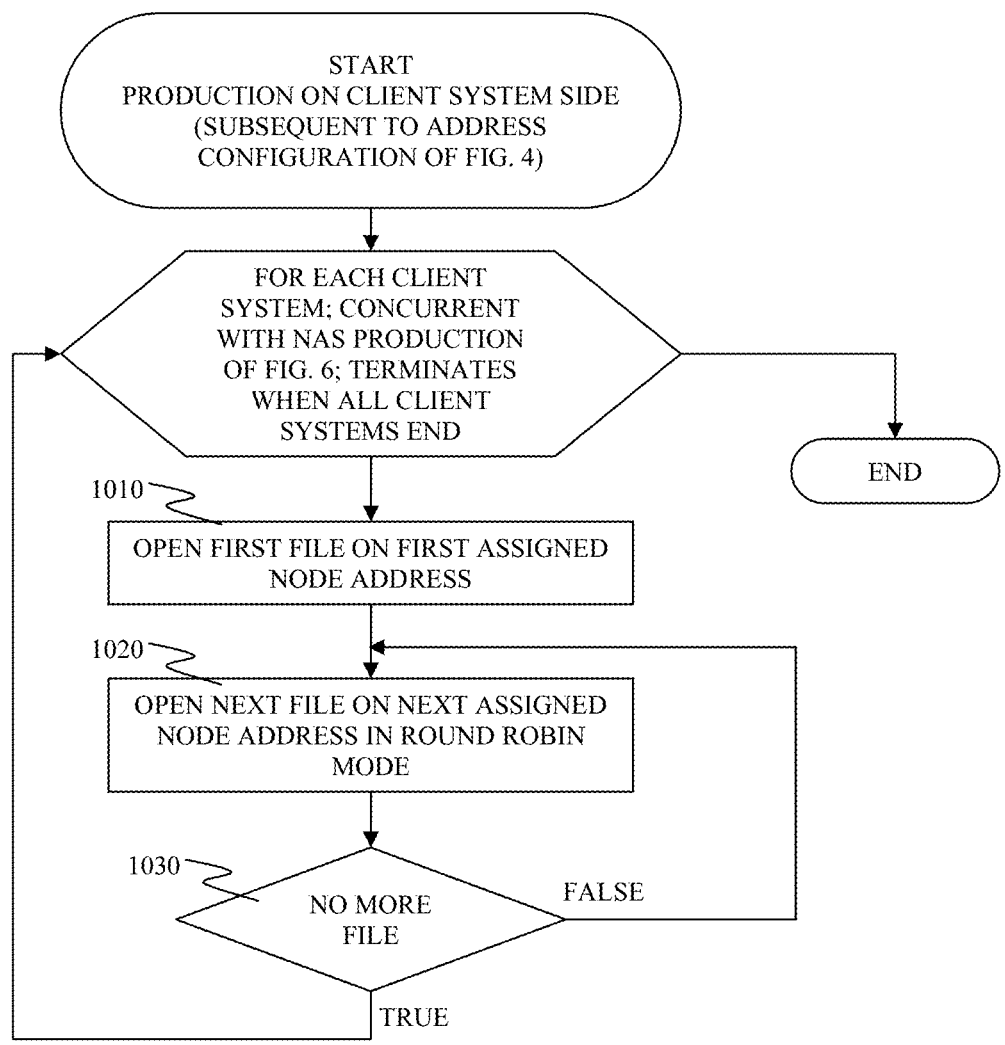
FIG. 5 is a flowchart depicting production steps performed by each client system subsequent to address configuration of FIG. 4, concurrently with the administration module performing step 300 of the method for optimizing usage of the clustered NAS in FIG. 2, in accordance with the embodiments of the present invention.

In step 300, the administration module administers service performed by the NAS concurrently with the client systems performing workload production pursuant to FIG. 5 infra by use of the NAS. See description of FIG. 6 infra for details of address configuration in step 300. See description of FIG. 9 infra for an example of the system as going through a single node failover in performing step 300. Then the administration module as well as nodes of the NAS terminates operation.

Figure 3:
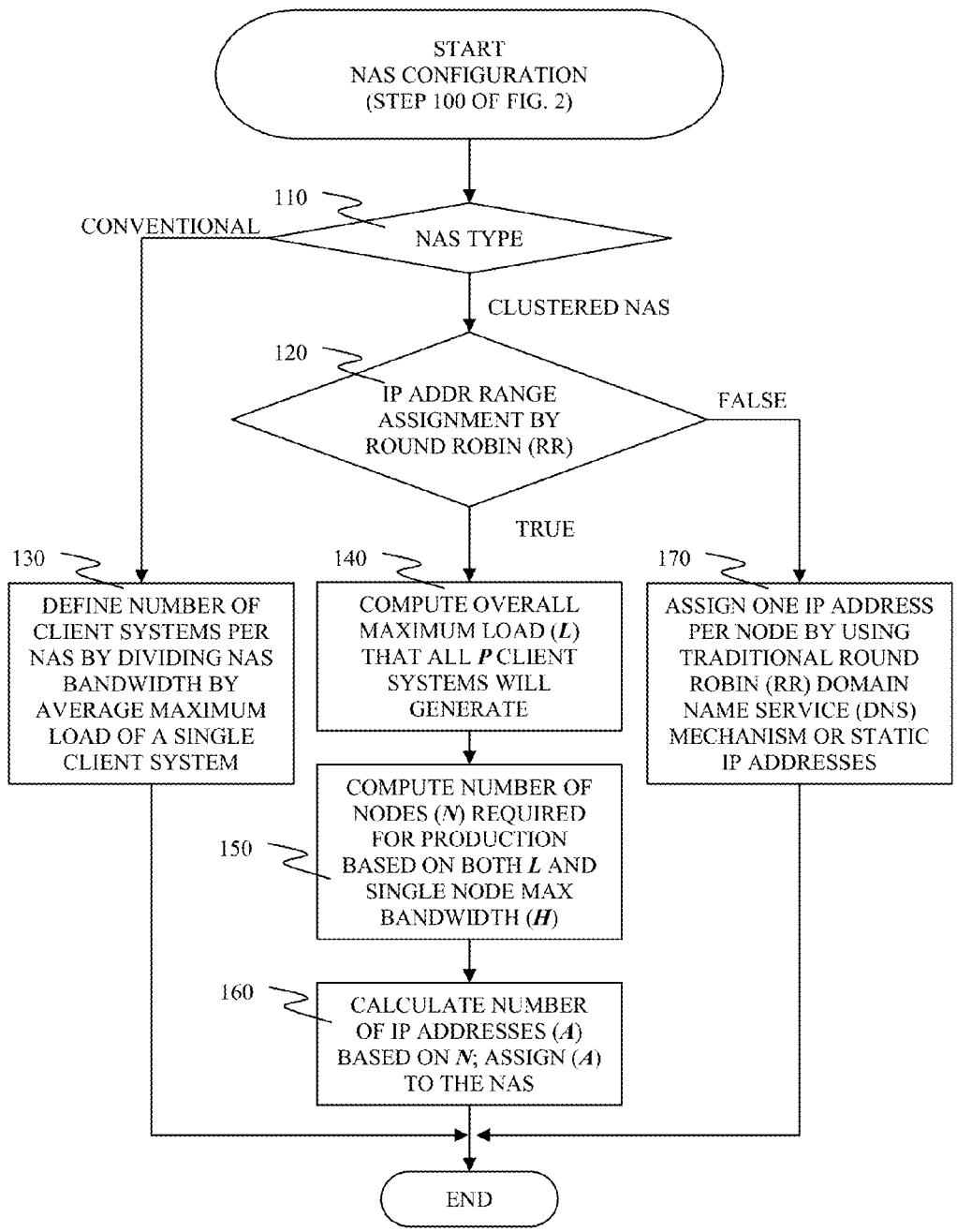
FIG. 3 is a flowchart depicting steps configuring NAS, performed as step 100 of the method for optimizing usage of the clustered NAS in FIG. 2, in accordance with the embodiments of the present invention.

FIG. 3 is a flowchart depicting steps configuring network attached storage of the clustered NAS, performed as step 100 of the method for optimizing usage of the clustered NAS in FIG. 2 supra, in accordance with the embodiments of the present invention.

In step 110, the administration module determines a type of the NAS, selected from {conventional NAS, clustered NAS}, wherein "conventional NAS" indicates a typical NAS, and wherein "clustered NAS" indicates a clustered NAS of the present invention. If the administration module determines that the NAS type is clustered, then the administration module proceeds with step 120. If the administration module determines that the NAS type is conventional, then the administration module proceeds with step 130.

In step 120, the administration module determines if an Internet Protocol (IP) address range is assigned by RR. If the administration module determines that the IP address range is assigned by RR, then the administration module proceeds with step 140. If the administration module determines that the IP address range is not assigned by RR, then the administration module proceeds with step 170.

In step 130, the administration module defines a fixed number of client systems per the conventional NAS by dividing a bandwidth value of the conventional NAS by an average value of maximum load of a single client system among the client systems. The conventional NAS does not perform load balancing or failover. Then the administration module terminates configuring the conventional NAS.

In steps 140 through 160, the administration module dynamically calculates a number of IP addresses (A) assigned by RR based on various parameters of the clustered NAS. In step 140, the administration module computes an overall maximum load (L) that all P number of client systems will generate during production. Then the administration module proceeds with step 150.

In step 150, the administration module computes a number of nodes (N) required for production based on both the overall max load (L) of step 140 supra and a single node maximum bandwidth (H) by applying N=Roundup(L/h)+1. Then the administration module proceeds with step 160.

In step 160, the administration module calculates a number of IP addresses (A) based on the number of nodes (N) computed in step 150 supra by applying A=N(N−1). Then the administration module terminates configuring the clustered NAS having the IP address range by RR and proceeds with step 200 of FIG. 2 supra for further configuring addresses for nodes of the clustered NAS having A number of with multiple IP addresses.

In step 170, the administration module assigns one (1) IP address for each node by using traditional round-robin domain name service (DNS) mechanism or static IP addresses. The clustered NAS having single IP address per node does not perform load balancing or failover as in the present invention. The clustered NAS having single IP address per node needs a throughput equal to twice as much as the aggregated clients load to insure failover. Then the administration module terminates configuring the clustered NAS having single IP address per node.

Figure 4:
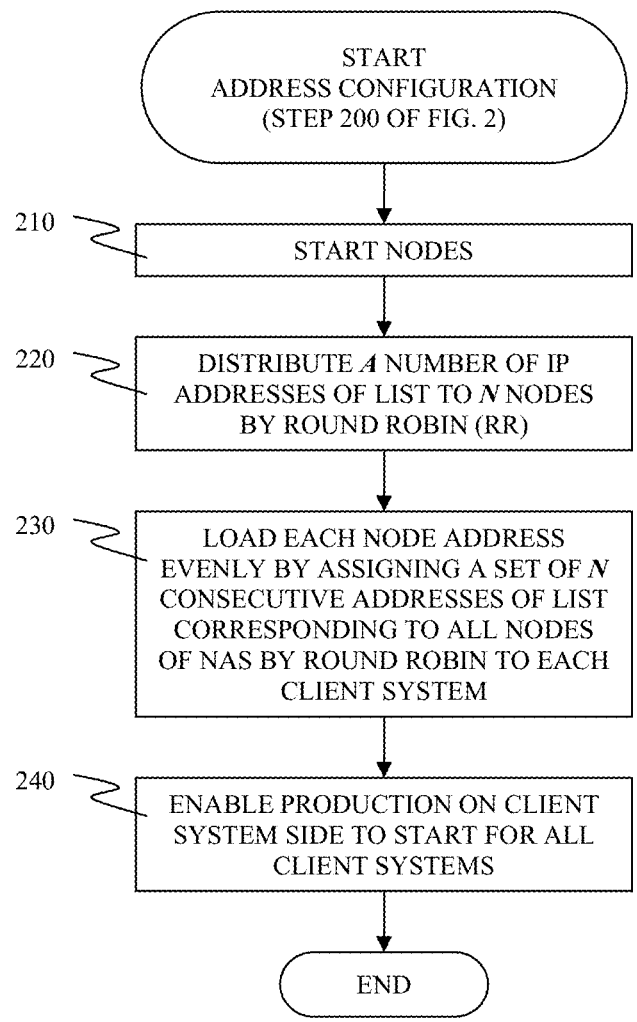
FIG. 4 is a flowchart depicting steps configuring addresses of the components in the NAS and client systems accessing the NAS, performed as step 200 of the method for optimizing usage of the clustered NAS in FIG. 2, in accordance with the embodiments of the present invention.

FIG. 4 is a flowchart depicting steps configuring addresses of the components in the NAS and client systems accessing the NAS, performed as step 200 of the method for optimizing usage of the clustered NAS in FIG. 2 supra, in accordance with the embodiments of the present invention.

In step 210, the administration module starts nodes of the clustered NAS configured in step 100 of FIG. 2 supra. Then the administration module proceeds with step 220.

In step 220, the administration module distributes the A=N (N−1) number of IP addresses of a list, as calculated in step 160 of FIG. 3 supra, to the N number of nodes of the clustered NAS by RR, as computed in step 150 of FIG. 3 supra. Each node has a respective portion of the list enumerating the A number of IP addresses through which said each node is accessed, as being distributed by RR. See description of FIG. 8 infra for an exemplary state of initial address distribution after step 220. Then the administration module proceeds with step 230.

In step 230, the administration module loads each node address evenly with L/N amount of load by assigning a set of N consecutive addresses of the list corresponding to all nodes of the clustered NAS by round-robin to each client system. Then the administration module proceeds with step 240.

In step 240, the administration module enables client system to start performing production as shown in FIG. 5 infra. Then the administration module terminates configuring addresses of the clustered NAS and proceeds with step 300 of FIG. 2 supra for production corresponding to client system production of FIG. 5 infra.

FIG. 5 is a flowchart depicting production steps performed by each client system subsequent to address configuration of FIG. 4 supra, concurrently with the administration module performing step 300 of the method for optimizing usage of the clustered NAS in FIG. 2 supra, in accordance with the embodiments of the present invention.

Once the clustered NAS is configured in steps 100 and 200 of FIG. 2, each client system independently performs steps 1010, 1020, and 1030 of FIG. 5, while accessing the clustered NAS, which is shared among all client systems.

In step 1010, a client system opens a first file on a first assigned node IP address. Then the client system proceeds with step 1020.

In step 1020, the client system opens a next file on a next assigned node IP address in RR such that each node is evenly loaded in servicing files for all client systems. Then the client system proceeds with step 1030.

In step 1030, the client system determines if there is any more file to open for production. If the client system determines that there is more file left to open, then the client system loops back to step 1020 to open a next unopened file on a corresponding node. If the client system determines that there is no more file to open, then the client system terminates a current cycle of production. In this specification, client system production defines a file opening and accesses by reading and/or writing the opened files according the production needs. In this specification, the read and write throughput on all files of all client systems is deemed homogeneous and requires an identical average bandwidth.

When all client systems of the NAS reaches respective nominal production load, the workload throughout the nodes of the NAS is evenly distributed. An average workload for a node is calculated as (L/N), wherein L is the overall maximum load from step 140 supra, and wherein N is the number of nodes required for production from step 150 supra. Also, each address gets an average (1/N) of an average maximum single workload for a client system, which is calculated as (L/P), wherein P is the number of client systems to be serviced by the clustered NAS.

Figure 6:
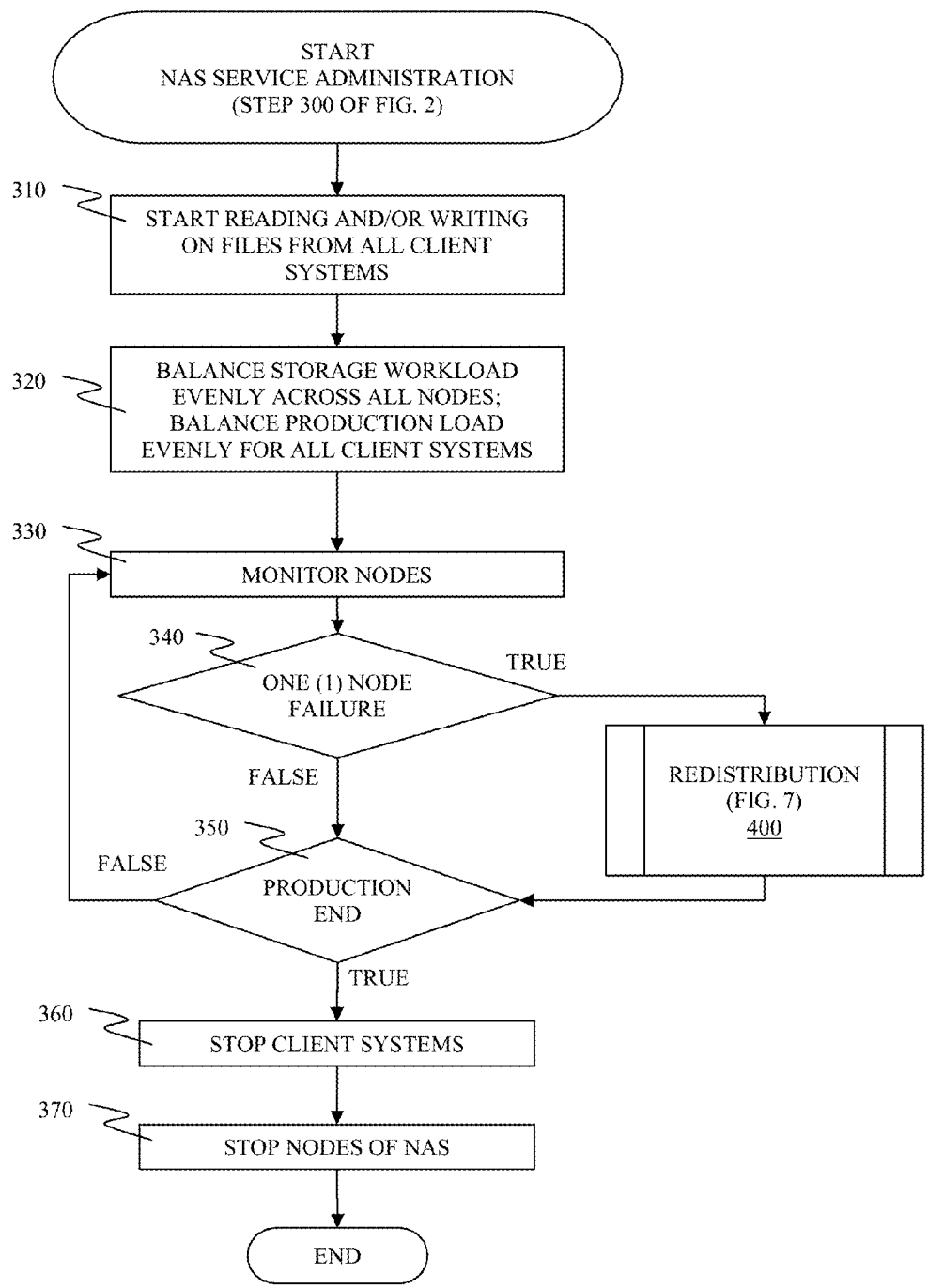
FIG. 6 is a flowchart depicting steps administering service of the NAS, performed as step 300 of the method for optimizing usage of the clustered NAS in FIG. 2, in accordance with the embodiments of the present invention.

FIG. 6 is a flowchart depicting steps administering service of the clustered NAS, performed as step 300 of the method for optimizing usage of the clustered NAS in FIG. 2 supra, in accordance with the embodiments of the present invention.

In step 310, the administration module starts reading and/or writing operations on open files from all client systems. Then the administration module proceeds with step 320.

In step 320, the administration module balances a storage workload of the clustered NAS evenly across all nodes of the clustered NAS. The administration module also balances a production load of all client systems evenly. Then the administration module proceeds with step 330.

In step 330, the administration module monitors status of nodes in production. The administration module proceeds with step 340 upon receiving notice of a node incident or after a fixed short predefined period of time.

In step 340, the administration module determines if one (1) node incident was reported leading to a node failure. If the administration module determines that a node had failed as a consequence of the node incident, then the administration module proceeds with step 400 of redistribution for load balancing and address redistribution. See description of FIG. 7 infra for details of step 400 of redistribution. If the administration module determines that there is no reported node incident or that the node incident did not lead to a node failure, then the administration module proceeds to step 350.

In step 350, the administration module determines if the production of the clustered NAS is over. If the administration module determines that the production of the clustered NAS may continue, then the administration module loops back to step 330 supra for further production and monitoring. If the administration module determines that the production of the clustered NAS is over, then the administration module proceeds with step 360 for terminating the system. The production of the clustered NAS may be over upon expiration of a scheduled daily production period, upon completion of processing all files of the client systems, or upon receiving command to terminate from the administrator.

In step 360, the administration module stops the client systems. Then the administration module proceeds with step 370.

In step 370, the administration module stops the nodes of the clustered NAS. Then the administration module terminates the production and monitoring.

Figure 7:
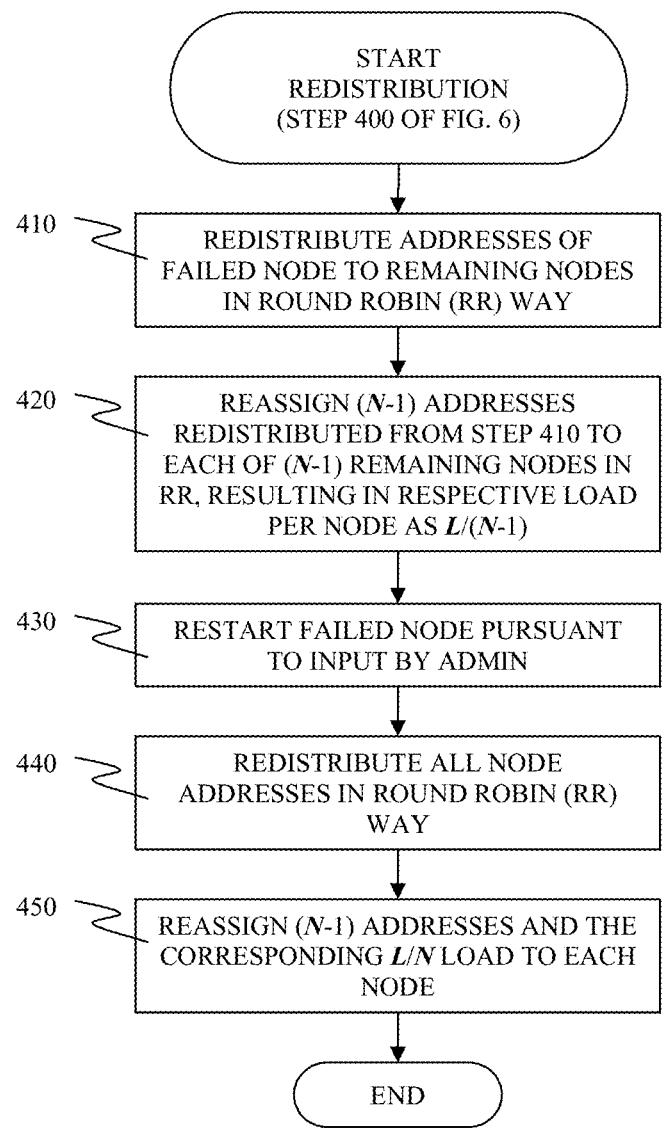
FIG. 7 is a flowchart depicting steps redistributing network address among remaining nodes of the NAS when a node failed, performed as step 400 of the method for optimizing usage of the clustered NAS in FIG. 2, in accordance with the embodiments of the present invention.

FIG. 7 is a flowchart depicting steps redistributing network address among remaining nodes of the clustered NAS when a node failed, performed as step 400 of the method for optimizing usage of the clustered NAS in FIG. 2 supra, in accordance with the embodiments of the present invention.

In step 410, the administration module redistributes (N−1) addressees of the failed node to (N−1) number of remaining nodes in RR. See description of FIG. 9 infra for an example of the address redistribution as reassigned pursuant to step 420 infra. Then the administration module proceeds with step 420.

In step 420, the administration module reassigns (N−1) addresses to each node of (N−1) number of remaining nodes that are normally operating in round-robin. As a result, each node of (N−1) number of remaining nodes services N addressees for L/(N−1) workload. Then the administration module proceeds with step 430.

In step 430, the administration module restarts the failed node pursuant to inputs provided by the administrator. Then the administration module proceeds with step 440.

In step 440, the administration module redistributes all node addresses in RR resulting in a recovered address configuration identical to the result from step 220 of FIG. 4 supra. Then the administration module proceeds with step 450.

In step 450, the administration module reassigns (N−1) number of addresses and L/N respective workload to each node the clustered NAS, since all N nodes are normally operating and accessible after performing steps 430 and 440. Then the administration module terminates the redistribution and proceeds with step 350 of FIG. 6 supra.

Figure 8:
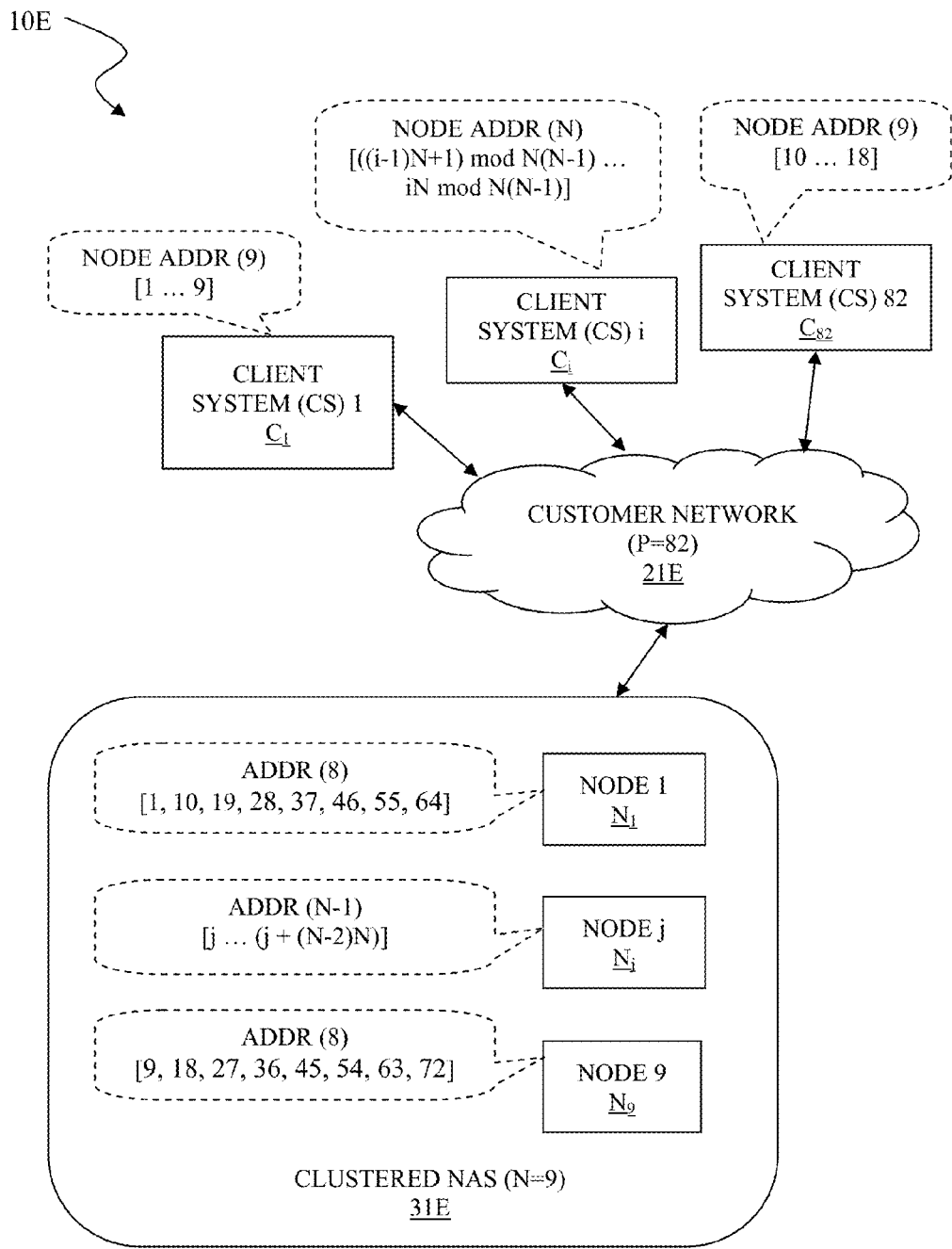
FIG. 8 is an example of the system of FIG. 1 for optimizing usage of a clustered NAS, as being initially configured by performing steps 100 and 200 of FIG. 2, in accordance with embodiments of the present invention.

FIG. 8 is an example of the system of FIG. 1 supra, for optimizing usage of a clustered NAS, as being initially configured by performing steps 100 and 200 of FIG. 2 supra, in accordance with embodiments of the present invention.

In this example, there are eighty two (82) client systems coupled to the clustered NAS having nine (9) nodes via a customer network 21E. Accordingly, parameters are set as P=82 and N=9.

First, the administration module assigns (N−1) number of addresses to each node of (N=9) nodes, that is eight (8) addresses per node in RR. Thus, a total number of addresses usable in accessing nodes of the clustered NAS is (A=N(N−1)=72). In this example, a j-th node $N_j$ is associated with (N−1=8) addresses comprising [j, j+N, j+2N ... (j+(N−2)N)], wherein j is a positive integer. As a result, a first node $N_1$ is accessible by addresses {1, 10, 19, 28, 37, 46, 55, 64}, a second node $N_2$ is accessible by addresses {2, 11, 20, 29, 38, 47, 56, 65}, a third node $N_3$ is accessible by addresses {3, 12, 21, 30, 39, 48, 57, 66}, a fourth node $N_4$ is accessible by addresses {4, 13, 22, 31, 40, 49, 58, 67}, a fifth node $N_5$ is accessible by addresses {5, 14, 23, 32, 41, 50, 59, 68}, a sixth node $N_6$ is accessible by addresses {6, 15, 24, 33, 42, 51, 60, 69}, a seventh node $N_7$ is accessible by addresses {7, 16, 25, 34, 43, 52, 61, 70}, an eighth node Ng is accessible by addresses {8, 17, 26, 35, 44, 53, 62, 71}, and a ninth node $N_9$ is accessible by addresses {9, 18, 27, 36, 45, 54, 63, 72}.

Subsequent to assigning addresses to all nodes, the administration module assigns each client system of all 82 client systems evenly to a respective range of (N=9) number of addresses enabling accesses to all nine (9) nodes in the clustered NAS such that each node services a uniform number of client systems without significant workload variation from node to node. In this example, an i-th client system $C_i$ uses nodes having addresses in an i-th range of [((i−1)N+1) mod N(N−1) ... iN mod N(N−1)], wherein i is a positive integer. Consequently, client systems $C_1$, $C_9$, $C_{17}$, $C_{25}$, $C_{33}$, $C_{41}$, $C_{49}$, $C_{57}$, $C_{65}$, $C_{73}$, $C_{81}$ use nodes with addresses in a first range of [1 ... (N=9)], client systems $C_2$, $C_{10}$, $C_{18}$, $C_{26}$, $C_{34}$, $C_{42}$, $C_{50}$, $C_{58}$, $C_{66}$, $C_{74}$, $C_{82}$ use nodes with addresses in a second range of [(N+1=10) ... (2N=18)] client systems $C_3$, $C_{11}$, $C_{19}$, $C_{27}$, $C_{35}$, $C_{43}$, $C_{51}$, $C_{59}$, $C_{67}$, $C_{75}$ use nodes with addresses in a third range of [(2N+1=19) ... (3N=27)], client systems $C_4$, $C_{12}$, $C_{20}$, $C_{28}$, $C_{36}$, $C_{44}$, $C_{52}$, $C_{60}$, $C_{68}$, $C_{76}$ use nodes with addresses in a fourth range of [(3N+1=28) ... (4N=36)] client systems $C_5$, $C_{13}$, $C_{21}$, $C_{29}$, $C_{37}$, $C_{45}$, $C_{53}$, $C_{61}$, $C_{69}$, $C_{77}$ use nodes with addresses in a fifth range of [(4N+1=37) ... (5N=45)], client systems $C_6$, $C_{14}$, $C_{22}$, $C_{30}$, $C_{38}$, $C_{46}$, $C_{54}$, $C_{62}$, $C_{70}$, $C_{78}$ use nodes with addresses in a sixth range of [(5N+1=46) ... (6N=54)] client systems $C_7$, $C_{15}$, $C_{23}$, $C_{31}$, $C_{39}$, $C_{47}$, $C_{55}$, $C_{63}$, $C_{71}$, $C_{79}$ use nodes with addresses in a seventh range of [(6N+1=55) ... (7N=63)], and client systems $C_8$, $C_{16}$, $C_{24}$, $C_{32}$, $C_{40}$, $C_{48}$, $C_{56}$, $C_{64}$, $C_{72}$, $C_{80}$ use nodes with addresses in an eighth range of [(7N+1=64) ... (8N=72)].

Figure 9:
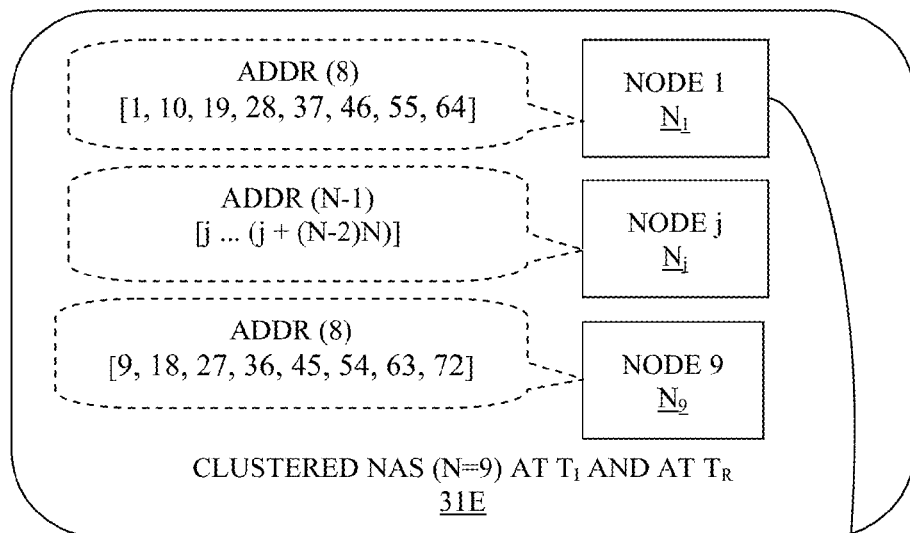
FIG. 9 is an example of the system of FIG. 1, for optimizing usage of a clustered NAS, as performing redistribution of addresses of a failed node by performing step 400 of FIG. 6, subsequent to the address configuration shown in FIG. 8, in accordance with embodiments of the present invention.
Figure 9:
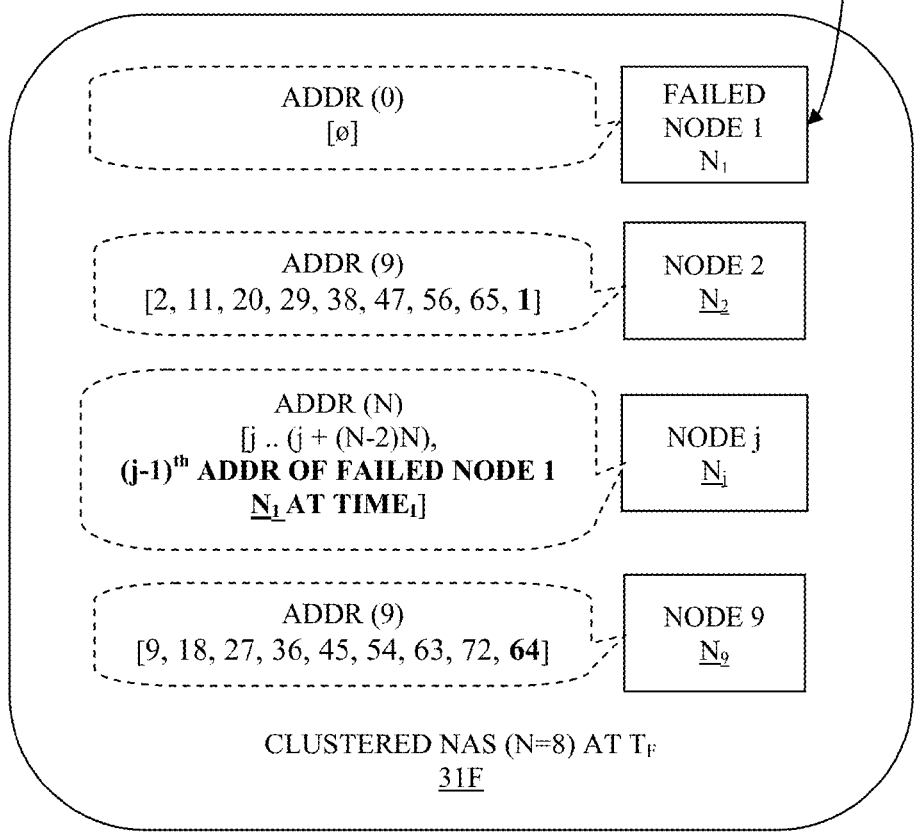

FIG. 9 is an example of the system of FIG. 1 supra, for optimizing usage of a clustered NAS, as performing redistribution of addresses of a failed node by performing step 400 of FIG. 6 supra, subsequent to the address configuration shown in FIG. 8 supra, in accordance with embodiments of the present invention.

At an initial point of time $T_I$, addresses for nodes in the clustered NAS are configured as 31E as shown in FIG. 8 supra.

At a failover point of time $T_F$ subsequent to the initial point of time $T_I$, addresses for nodes in the clustered NAS are configured as 31F, showing redistributed addresses for remaining nodes of the clustered NAS. In this example, the first node $N_1$ that used to be accessible by addresses {1, 10, 19, 28, 37, 46, 55, 64} at $T_I$ had failed and the first node $N_1$ is not in service for any client system. The addresses {1, 10, 19, 28, 37, 46, 55, 64} that had been assigned for the first node $N_1$ is redistributed to remaining (N−1) number of nodes $N_j$ in RR, wherein j is a positive integer selected from [2 . . . 9]. Each remaining node $N_j$ adds a (j−1)-th address from addresses of the failed first node $N_1$ to the respective addresses of said each remaining node $N_j$ at the initial point of time $T_I$ as boldfaced in 31F of FIG. 9. During a period of time between the failover time $T_F$ and when recovery of the addresses is completed by performing steps 430 through 450 of FIG. 7 supra, the clustered NAS provides services to the client systems by use of (N−1=8) number of remaining nodes with respective (N=9) number of addresses, thus the number of addresses available for the client systems to access the nodes of the clustered NAS, that is A=N(N−1)=72, remains same as prior to the failure of the first node $N_1$ such that no specific client system suffers degraded performance as a result of the first node $N_1$ failure. Each remaining node $N_j$ takes over L/(N−1=8) workload corresponding to the additional address redistributed from the failed first node $N_1$, which results in a respectively increased ⅛ (12.5%) workload from the initial workload of L prior to the first node failure.

At a restart point of time $T_R$ subsequent to the failover point of time $T_F$, the addresses for nodes in the clustered NAS are recovered back to the address configuration at the initial point of time $T_I$ as shown in 31E of FIG. 9.

In one embodiment of the present invention, the nodes of the clustered NAS and respectively associated addresses are represented in a data structure referred to as a "cluster address matrix", which has columns for each node and rows for addresses respectively associated with said each node.

Figure 10:
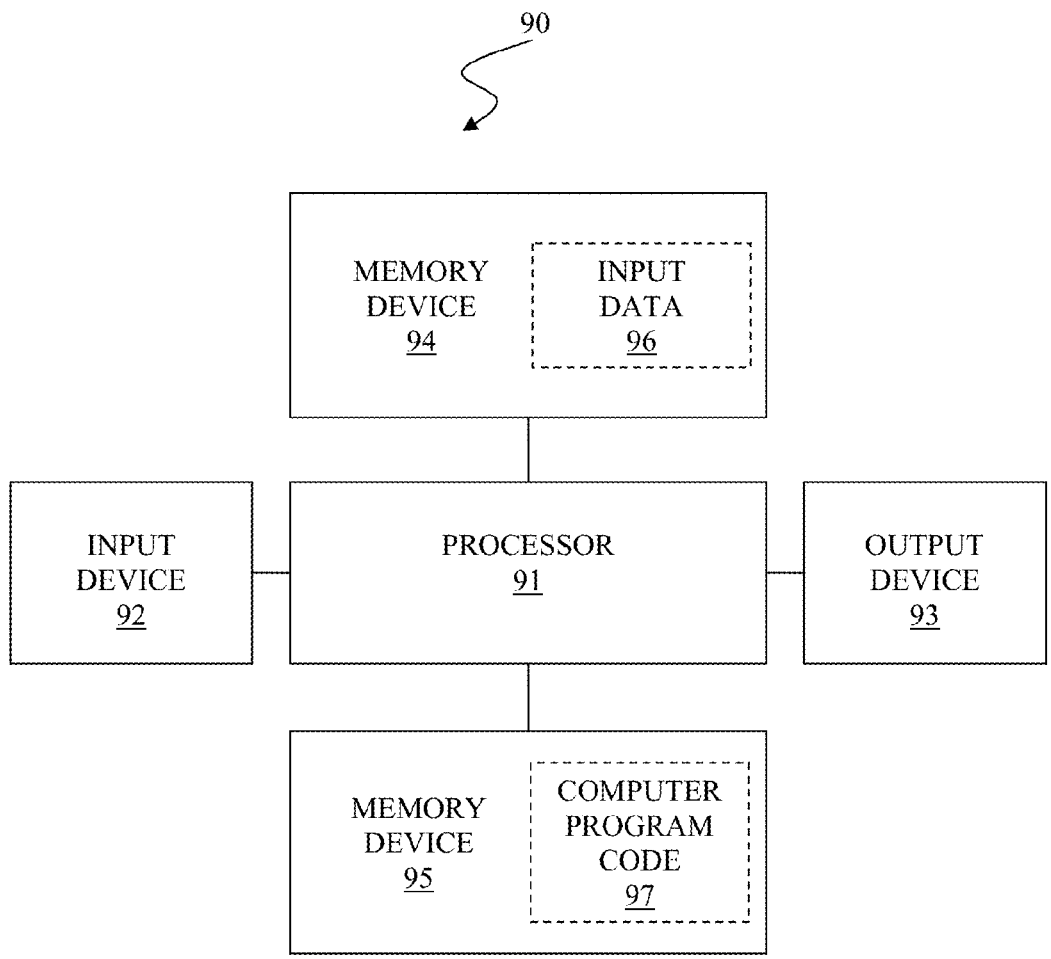
FIG. 10 illustrates a computer system used for optimizing usage of a clustered NAS, in accordance with the embodiments of the present invention.

FIG. 10 illustrates a computer system 90 used for optimizing usage of a clustered NAS, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VoIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for optimizing usage of the clustered NAS of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for optimizing usage of the clustered NAS.

In another embodiment, the invention provides a method that performs the process steps of the invention on a subscription, advertising and/or fee basis. That is, a service provider, such as a Solution Integrator, can offer to create, maintain, support, etc., a process for optimizing usage of the clustered NAS of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing usage of a clustered-network attached storage (NAS), said method comprising:

configuring the clustered NAS by determining A number of addresses and N number of nodes in the clustered NAS that produces L amount of load for P number of client systems producing each an equivalent and constant load, and coupled to the clustered NAS such that said A number of addresses enables said P number of client systems to evenly access said N number of nodes for sharing said L amount of load, wherein each node of said N number of nodes is configured to produce a respective h amount of load, and wherein N is greater than 2;

configuring a respective set of addresses selected from said A number of addresses such that said P number of client systems accesses said N number of nodes via the respective set of addresses during production of said L amount of load by said P number of client systems; and administering service of the clustered NAS, concurrently with the production by said P number of client systems, by monitoring and optimizing the service of said N number of nodes in the clustered NAS such that the clustered NAS compensates a failure of a node in the clustered NAS and such that the clustered NAS seamlessly services the production of said L amount of load by said P number of client systems, wherein said configuring the clustered NAS comprises:

computing said L as a maximum amount of load that said P number of client systems generate to be serviced by the clustered NAS;

computing said N as a function of L/h to represents a number of nodes in the clustered NAS to service the computed L amount of load; and calculating said A that represents a number of addresses necessary for the computed N number of nodes in the clustered NAS as A=N(N−1).

2. The method of claim 1, wherein the function of L/h is Roundup (L/h)+1.

3. The method of claim 1, wherein said configuring the respective set of addresses comprises:

distributing said A number of addresses over said N number of nodes by round-robin (RR), wherein the addresses are consecutive within a list of addresses, such that said each node is associated with a respective set of (N−1) addresses, and such that any two individual addresses in the respective set of (N−1) addresses are distant from each other by N number of entries in the list of addresses;

assigning a respective set of N consecutive addresses in the list to each client system of said P number of client systems by RR, wherein the N consecutive addresses in the list respectively corresponds to said each node, such that said each client system has access to all nodes in the clustered NAS by use of the N consecutive addresses in the respective set, and such that a respective address for said each node uniformly shares L/N amount of load for said each node.

4. The method of claim 1, wherein said administering comprises:

monitoring said N number of nodes in the clustered NAS during the production by said P number of client systems;

determining that a first node of said N number of nodes has failed based on said monitoring; and redistributing a first set of (N−1) addresses and corresponding load previously associated with the first node to the rest of (N−1) nodes of the clustered NAS such that said P number of client systems access the rest of (N−1) nodes by use of said A number of addresses during the production by said P number of client systems.

5. The method of claim 4, wherein said redistributing comprises:

distributing the first set of (N−1) addresses to the rest of (N−1) nodes that are normally operating by round-robin (RR) such that each operating node of the rest of (N−1) nodes is associated with a new respective set of N addresses, and such that the new respective set of N addresses further comprises a respective additional address from the first set of (N−1) addresses for the first node selected by RR for said each operating node;

assigning a respective load associated with each address of the first set of (N−1) addresses to said each operating node such that said each operating node services the new respective set of N addresses for uniformly shared (L/(N−1)) load for the production by said P number of client systems.

6. A computer program product, comprising:

a computer readable memory unit that embodies a computer readable program code, said computer readable program code containing instructions that perform optimizing usage of a clustered-network attached storage (NAS), said optimizing comprising:

configuring the clustered NAS by determining A number of addresses and N number of nodes in the clustered NAS that produces L amount of load for P number of client systems producing each an equivalent and constant load, and coupled to the clustered NAS such that said A number of addresses enables said P number of client systems to evenly access said N number of nodes for sharing said L amount of load, wherein each node of said N number of nodes is configured to produce a respective h amount of load, and wherein N is greater than 2;

configuring a respective set of addresses selected from said A number of addresses such that said P number of client systems accesses said N number of nodes via the respective set of addresses during production of said L amount of load by said P number of client systems; and administering service of the clustered NAS, concurrently with the production by said P number of client systems, by monitoring and optimizing the service of said N number of nodes in the clustered NAS such that the clustered NAS compensates a failure of a node in the clustered NAS and such that the clustered NAS seamlessly services the production of said L amount of load by said P number of client systems, wherein said configuring the clustered NAS comprises:

computing said L as a maximum amount of load that said P number of client systems generate to be serviced by the clustered NAS;

computing said N as a function of L/h to represents a number of nodes in the clustered NAS to service the computed L amount of load; and calculating said A that represents a number of addresses necessary for the computed N number of nodes in the clustered NAS as A=N(N−1).

7. The computer program product of claim 6, wherein the function of L/h is Roundup (L/h)+1.

8. The computer program product of claim 6, wherein said configuring the respective set of addresses comprises:

distributing said A number of addresses over said N number of nodes by round-robin (RR), wherein the addresses are consecutive within a list of addresses, such that said each node is associated with a respective set of (N−1) addresses, and such that any two individual addresses in the respective set of (N−1) addresses are distant from each other by N number of entries in the list of addresses;

assigning a respective set of N consecutive addresses in the list to each client system of said P number of client systems by RR, wherein the N consecutive addresses in the list respectively corresponds to said each node, such that said each client system has access to all nodes in the clustered NAS by use of the N consecutive addresses in the respective set, and such that a respective address for said each node uniformly shares L/N amount of load for said each node.

9. The computer program product of claim 6, wherein said administering comprises:

monitoring said N number of nodes in the clustered NAS during the production by said P number of client systems;

determining that a first node of said N number of nodes has failed based on said monitoring; and redistributing a first set of (N−1) addresses and corresponding load previously associated with the first node to the rest of (N−1) nodes of the clustered NAS such that said P number of client systems access the rest of (N−1) nodes by use of said A number of addresses during the production by said P number of client systems.

10. The computer program product of claim 9, wherein said redistributing comprises:

distributing the first set of (N−1) addresses to the rest of (N−1) nodes that are normally operating by round-robin (RR) such that each operating node of the rest of (N−1) nodes is associated with a new respective set of N addresses, and such that the new respective set of N addresses further comprises a respective additional address from the first set of (N−1) addresses for the first node selected by RR for said each operating node;

assigning a respective load associated with each address of the first set of (N−1) addresses to said each operating node such that said each operating node services the new respective set of N addresses for uniformly shared (L/(N−1)) load for the production by said P number of client systems.

11. A computer system comprising a processor, a memory coupled to the processor, and a computer readable storage device coupled to the processor, said storage device containing computer readable program code configured to be executed by the processor via the memory to implement a method for optimizing usage of a clustered-network attached storage (NAS), said method comprising:

configuring the clustered NAS by determining A number of addresses and N number of nodes in the clustered NAS that produces L amount of load for P number of client systems producing each an equivalent and constant load, and coupled to the clustered NAS such that said A number of addresses enables said P number of client systems to evenly access said N number of nodes for sharing said L amount of load, wherein each node of said N number of nodes is configured to produce a respective h amount of load, and wherein N is greater than 2;

configuring a respective set of addresses selected from said A number of addresses such that said P number of client systems accesses said N number of nodes via the respective set of addresses during production of said L amount of load by said P number of client systems; and administering service of the clustered NAS, concurrently with the production by said P number of client systems, by monitoring and optimizing the service of said N number of nodes in the clustered NAS such that the clustered NAS compensates a failure of a node in the clustered NAS and such that the clustered NAS seamlessly services the production of said L amount of load by said P number of client systems, wherein said configuring the clustered NAS comprises:
computing said L as a maximum amount of load that said P number of client systems generate to be serviced by the clustered NAS;
computing said N as a function of L/h to represents a number of nodes in the clustered NAS to service the computed L amount of load; and
calculating said A that represents a number of addresses necessary for the computed N number of nodes in the clustered NAS as A=N(N−1).

12. The computer system of claim 11, wherein the function of L/h is Roundup(L/h)+1.

13. The computer system of claim 11, wherein said configuring the respective set of addresses comprises:

distributing said A number of addresses over said N number of nodes by round-robin (RR), wherein the addresses are consecutive within a list of addresses, such that said each node is associated with a respective set of (N−1) addresses, and such that any two individual addresses in the respective set of (N−1) addresses are distant from each other by N number of entries in the list of addresses;

assigning a respective set of N consecutive addresses in the list to each client system of said P number of client systems by RR, wherein the N consecutive addresses in the list respectively corresponds to said each node, such that said each client system has access to all nodes in the clustered NAS by use of the N consecutive addresses in the respective set, and such that a respective address for said each node uniformly shares L/N amount of load for said each node.

14. The computer system of claim 11, wherein said administering comprises:

monitoring said N number of nodes in the clustered NAS during the production by said P number of client systems;

determining that a first node of said N number of nodes has failed based on said monitoring; and redistributing a first set of (N−1) addresses and corresponding load previously associated with the first node to the rest of (N−1) nodes of the clustered NAS such that said P number of client systems access the rest of (N−1) nodes by use of said A number of addresses during the production by said P number of client systems.

15. The computer system of claim 14, wherein said redistributing comprises:

distributing the first set of (N−1) addresses to the rest of (N−1) nodes that are normally operating by round-robin (RR) such that each operating node of the rest of (N−1) nodes is associated with a new respective set of N addresses, and such that the new respective set of N addresses further comprises a respective additional address from the first set of (N−1) addresses for the first node selected by RR for said each operating node;

assigning a respective load associated with each address of the first set of (N−1) addresses to said each operating node such that said each operating node services the new respective set of N addresses for uniformly shared (L/(N−1)) load for the production by said P number of client systems.

16. A process for supporting computer infrastructure, said process comprising providing at least one support service for at least one of creating, integrating, hosting, maintaining, and deploying computer-readable code in a computing system, wherein the code in combination with the computing system is configured to perform a method for optimizing usage of a clustered-network attached storage (NAS), said method comprising:

configuring the clustered NAS by determining A number of addresses and N number of nodes in the clustered NAS that produces L amount of load for P number of client systems producing each an equivalent and constant load, and coupled to the clustered NAS such that said A number of addresses enables said P number of client systems to evenly access said N number of nodes for sharing said L amount of load, wherein each node of said N number of nodes is configured to produce a respective h amount of load, and wherein N is greater than 2;

configuring a respective set of addresses selected from said A number of addresses such that said P number of client systems accesses said N number of nodes via the respective set of addresses during production of said L amount of load by said P number of client systems; and administering service of the clustered NAS, concurrently with the production by said P number of client systems, by monitoring and optimizing the service of said N number of nodes in the clustered NAS such that the clustered NAS compensates a failure of a node in the clustered NAS and such that the clustered NAS seamlessly services the production of said L amount of load by said P number of client systems, wherein said configuring the clustered NAS comprises:
computing said L as a maximum amount of load that said P number of client systems generate to be serviced by the clustered NAS;

computing said N as a function of L/h to represents a number of nodes in the clustered NAS to service the computed L amount of load; and calculating said A that represents a number of addresses necessary for the computed N number of nodes in the clustered NAS as A=N(N−1).

17. The process of claim 16 wherein the function of L/h is Roundup (L/h)+1.

18. The process of claim 16, wherein said configuring the respective set of addresses comprises:

distributing said A number of addresses over said N number of nodes by round-robin (RR), wherein the addresses are consecutive within a list of addresses, such that said each node is associated with a respective set of (N−1) addresses, and such that any two individual addresses in the respective set of (N−1) addresses are distant from each other by N number of entries in the list of addresses;

assigning a respective set of N consecutive addresses in the list to each client system of said P number of client systems by RR, wherein the N consecutive addresses in the list respectively corresponds to said each node, such that said each client system has access to all nodes in the clustered NAS by use of the N consecutive addresses in the respective set, and such that a respective address for said each node uniformly shares L/N amount of load for said each node.

19. The process of claim 16, wherein said administering comprises:

monitoring said N number of nodes in the clustered NAS during the production by said P number of client systems;

determining that a first node of said N number of nodes has failed based on said monitoring; and redistributing a first set of (N−1) addresses and corresponding load previously associated with the first node to the rest of (N−1) nodes of the clustered NAS such that said P number of client systems access the rest of (N−1) nodes by use of said A number of addresses during the production by said P number of client systems.

20. The process of claim 19, wherein said redistributing comprises:

distributing the first set of (N−1) addresses to the rest of (N−1) nodes that are normally operating by round-robin (RR) such that each operating node of the rest of (N−1) nodes is associated with a new respective set of N addresses, and such that the new respective set of N addresses further comprises a respective additional address from the first set of (N−1) addresses for the first node selected by RR for said each operating node;

assigning a respective load associated with each address of the first set of (N−1) addresses to said each operating node such that said each operating node services the new respective set of N addresses for uniformly shared (L/(N−1)) load for the production by said P number of client systems.

\* \* \* \* \*